United States Patent [19]

Wycliffe

[11] Patent Number: 5,125,672
[45] Date of Patent: Jun. 30, 1992

[54] SHAFT SEALING ARRANGEMENTS

[75] Inventor: Henryk Wycliffe, Crawley, Great Britain

[73] Assignee: The BOC Group plc, Windlesham, England

[21] Appl. No.: 612,159

[22] Filed: Nov. 9, 1990

[30] Foreign Application Priority Data

Nov. 10, 1989 [GB] United Kingdom ............... 8925421

[51] Int. Cl.⁵ ............................................. F16J 15/32
[52] U.S. Cl. .................................. 277/152; 277/14 R; 277/25; 277/53
[58] Field of Search ............... 277/152, 153, 13, 14 R, 277/17, 18, 19, 21, 25, 53, 55–57

[56] References Cited

U.S. PATENT DOCUMENTS

| | | | |
|---|---|---|---|
| 3,685,838 | 8/1972 | Malmstrom | 277/25 |
| 3,897,169 | 7/1975 | Fowler | 277/56 |
| 4,079,947 | 3/1978 | Morris | 277/13 |
| 4,186,929 | 2/1980 | Burton et al. | 277/152 |
| 4,304,412 | 12/1981 | Ladin | 277/94 |
| 4,436,317 | 3/1984 | Schmitt | 277/153 |
| 4,437,821 | 3/1984 | Ogawa | 277/152 |
| 4,583,749 | 4/1986 | Hatch | 277/152 |

FOREIGN PATENT DOCUMENTS

| | | | |
|---|---|---|---|
| 0183345 | 4/1986 | European Pat. Off. | 86/23 |
| 3202381 | 8/1983 | Fed. Rep. of Germany | 277/153 |
| 0219255 | 2/1985 | Fed. Rep. of Germany | 277/153 |
| 0169177 | 7/1989 | Japan | 277/152 |
| 1446275 | 8/1976 | United Kingdom | 277/153 |

Primary Examiner—William A. Cuchlinski, Jr.
Assistant Examiner—Daniel G. DePumpo
Attorney, Agent, or Firm—Robert I. Pearlman; David M. Rosenblum

[57] ABSTRACT

The present invention provides a sealing arrangement for effecting a seal with a rotatable shaft having with respect to its longitudinal axis a generally cylindrical shape but with a portion thereof of conical shape, which comprises a shaft seal positioned so that its sealing lip engages the shaft and so that any liquid escaping from a first (liquid) side of the seal to a second (air) side of the seal enters an annular cavity formed on one side by the conical portion of the shaft whose cross-sectional diameter decreases in a direction away from the sealing lip on the second side.

8 Claims, 3 Drawing Sheets

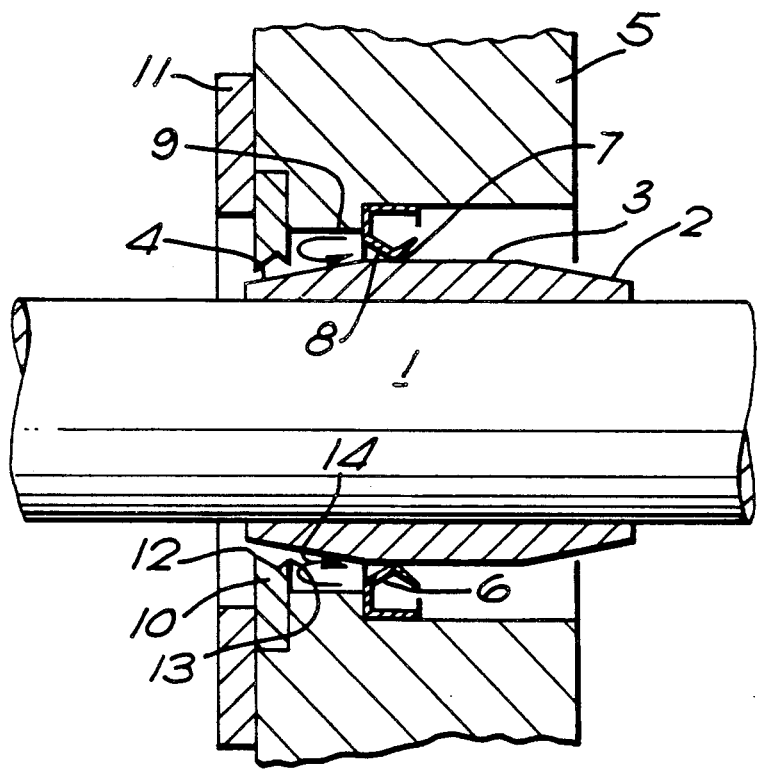
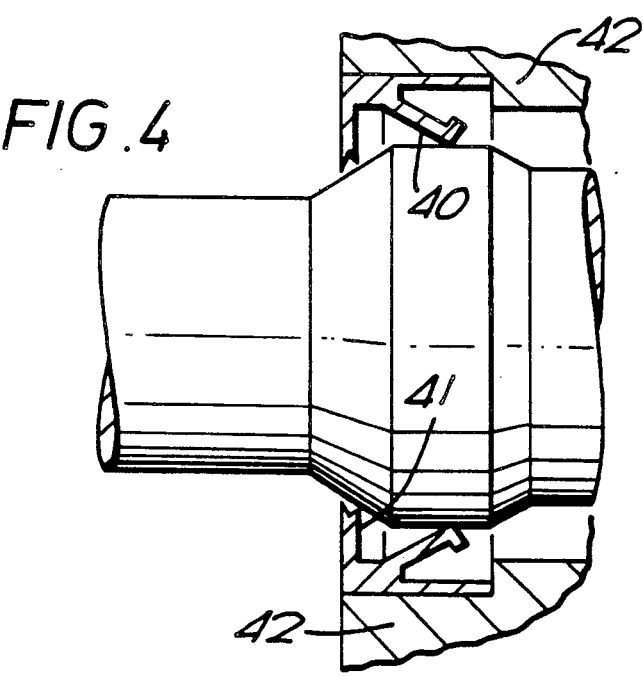

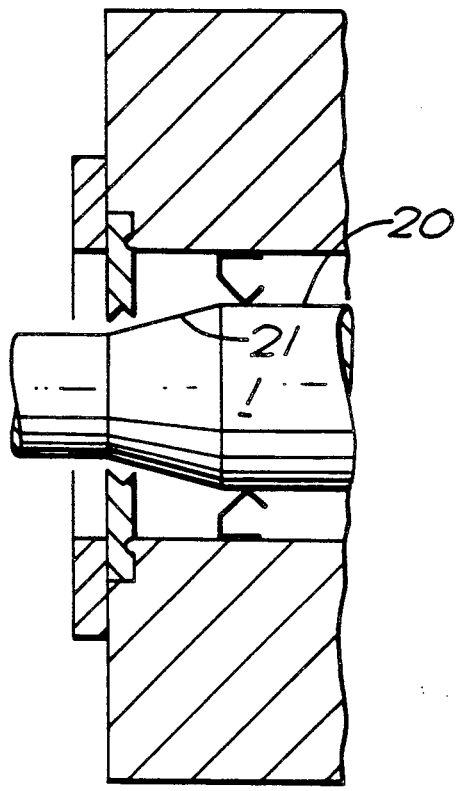
FIG. 2(i)
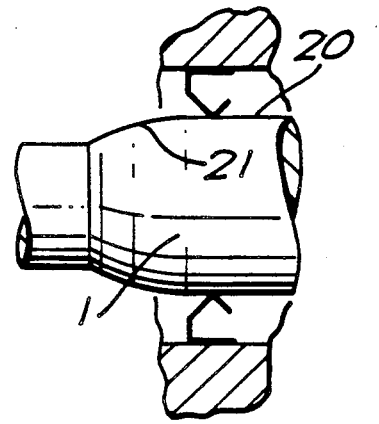
FIG. 2(ii)
FIG. 2(iii)
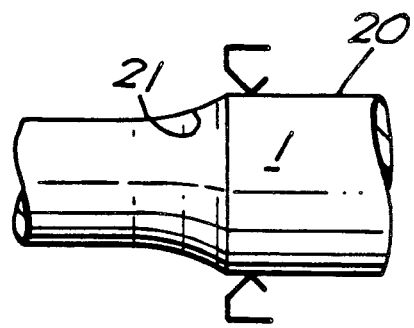

SHAFT SEALING ARRANGEMENTS

BACKGROUND OF THE INVENTION

This invention relates to a sealing arrangement for effecting a seal with a rotatable shaft.

A variety of different types of seals for rotating shafts is widely known and available for use in numerous arrangements to control and attempt to prevent leakage of oil or lubricant or other liquid past the seal. In a typical arrangement, a seal of rubber or PTFE in the form of an apertured disc is fitted about the rotating shaft so that the aperture forms a tight fit about a circumference of the shaft to provide a sealing lip at the point of contact with the shaft.

The sealing lip may have associated therewith a variety of sealing aids so that any oil in the vicinity of the lip or, more particularly, any oil which escapes past the lip is urged back to its correct side of the sealing lip. Such aids can commonly take the form of protrusions or grooves on the surface of the seal in the vicinity of the sealing lip which act to "fling" any oil impinging on them in a predetermined direction during rotation of the shaft. Such aids can be varied from seal to seal so that they can act unidirectionally, i.e. when the shaft rotates only in a single direction or bi-directionally, i.e. when the shaft rotates in either direction.

Although such shaft sealing arrangements can operate satisfactorily in many instances, there remain undoubted problems in effecting an adequate seal in certain cases. For example, in some specialist applications, there is often a need to employ oils or lubricants having certain properties which may give rise to particular problems in use with the shaft seals referred to above.

In the vacuum industry in particular, certain oils tend to be used having particular properties which are required in that industry. For example, the oils generally are often required to be chemically very inert and have a low vapour pressure. Particular oils that have been used are perfluoropolyethers available, for example, under the Trade Marks FOMBLIN and CRYTOX; however, such oils tend to possess low surface tension properties which can make them particularly difficult to seal with known shaft sealing arrangements in particular.

SUMMARY OF THE INVENTION

The present invention is concerned with the provision of a novel sealing arrangement which in general overcomes, or at least mitigates or minimises, such difficulties.

In accordance with the invention, there is provided a sealing arrangement for effecting a seal with a rotatable shaft having with respect to its longitudinal axis a generally cylindrical shape but with a portion thereof of conical shape, which comprises a shaft seal positioned so that its sealing lip engages the shaft and so that any liquid escaping from a first (liquid) side of the seal to a second (air) side of the seal enters an annular cavity formed on one side by the conical portion of the shaft whose cross-sectional diameter decreases in a direction away from the sealing lip on the second side.

For reasons concerning chiefly the maintenance of the sealing lip about a predetermined position on the shaft, it is preferred that the sealing lip engages a cylindrical portion of the shaft in the vicinity of the conical portion. Most preferably, the sealing lip engages the shaft on a cylindrical portion immediately adjacent the widest cross-sectional part of the conical portion.

In preferred embodiments of the invention, the sealing arrangement is such that liquid entering the cavity is constrained therein to form a well of liquid at the base thereof until sufficient liquid is present in the cavity to impinge on the conical portion of the shaft and thereby be urged by centrifugal force towards the sealing lip.

In such embodiments, means must be provided to constrain the liquid within the cavity and preferably the cavity is formed, in addition to the conical portion of the shaft, by the air side of the shaft seal and a radially extending apertured plate member positioned about the shaft.

To ensure that sufficient liquid is constrained within the cavity to enable it to impinge on the conical portion of the shaft, the aperture of the plate member preferably has a diameter less than that of the cylindrical portion of the shaft in which the shaft seal is positioned.

For reasons mainly concerned with ease of access of the shaft within the sealing arrangement, it is preferred that the plate member is made from a flexible material so that the shaft itself can, if necessary, be withdrawn and replaced with the sealing arrangement remaining in situ.

The plate member preferably has a double lipped aperture, the first lip nearer the shaft seal being of greater diameter than the second lip more remote from the shaft seal. Such a double lip assists in ensuring that the liquid constrained in the cavity is retained by the plate member and does not escape therefrom. With such a double lip the diameter of the aperture in respect of each lip should be smaller than the cross sectional diameter of the cylindrical portion of the shaft in the vicinity of the sealing lip.

The conical portion can be formed in the shaft by means of a sleeve secured to the shaft. In such cases, the sleeve will usually provide not only the conical portion but also the cylindrical portion to which the sealing lip preferably engages.

Alternatively, the conical portion can be formed integrally with the shaft.

With regard to the "conical portion" in general, this term clearly includes shapes which approximate to conical and includes frusto-conical shapes and those whose sides are convex or concave rather than straight line. The typical shaft for use in the sealing arrangement of the invention will include a first cylindrical portion and a second cylindrical portion of smaller cross-sectional diameter than that of the first portion with a "conical" portion in between of decreasing diameter between that of the first and second cylindrical portions In such an arrangement the sealing lip will preferably be positioned in the vicinity of the junction between the first cylindrical portion and the conical portion, most preferably on the cylindrical portion.

In certain embodiments of the invention, it may be preferred for the shaft seal and the apertured plate to be formed integrally.

BRIEF DESCRIPTION OF THE DRAWINGS

For a better understanding of the invention, reference will now be made to the accompanying drawings in which:

FIG. 1 is a sectional view through a sealing arrangement of the invention.

FIGS. 2(i), 2(ii) and 2(iii) show three schematic further sealing arrangements of the invention with integrally formed cylindrical and conical portions.

FIG. 4 shows a schematic further sealing arrangement of the invention with an integrally formed seal and apertured plate member.

DETAILED DESCRIPTION OF THE PREFERRED EMBODIMENTS

Figure 3I:
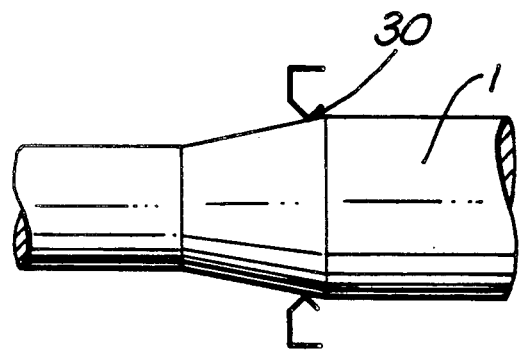
FIGS. 3(i) and 3(ii) show two schematic further sealing arrangements of the invention with conical portions of different conicities.

With reference to the drawings, FIG. 1 shows a sealing arrangement of the invention which comprises a rotatable shaft 1 about which is securely mounted on a sleeve 2. The sleeve 2 provides the shaft with a cylindrical portion 3 and a conical portion 4.

The shaft is positioned for rotation within a wall 5 of a housing against which the shaft is to be sealed with the liquid (oil) side being to the right as shown in FIG. 1 and the air side being to the left.

A shaft seal 6 is secured to the wall 5 by means not shown but of standard design; the seal 6 has a sealing lip 7 in contact with the cylindrical portion 3 of the shaft 1. The shaft seal is of known design and is made of either a rubber composition or PTFE so that the sealing lip 7 is resiliently held against the shaft. The sealing lip possesses "positive action aids" 8 on the air side of the lip 7 which act to pump any liquid which leaks past the lip 7 back to its source.

An annular cavity 9 is present on the air side of the shaft seal 6 and is formed as one side by the conical portion 4 of the shaft and on other sides by the air side of the shaft seal itself and by an apertured plate member 10 securely fixed to the housing 5 by means of a retaining disc 11. The plate member 10 is made from a flexible elastomeric material (so that in particular the shaft—i.e. including the sleeve 2—can be removed from the housing 5 during maintenance, etc) and its aperture has two lips 12,13. The diameter of the aperture of lip 13 is less than the external diameter of the cylindrical portion 3 of the shaft and the diameter of the aperture of lip 12 is less than the diameter of the aperture of the lip 13.

In use of the sealing arrangement shown in FIG. 1 with the shaft 1 (including the sleeve 2) rotating, any liquid which escapes past the sealing lip 7 and which is not returned to its source by the positive action aids 8 can either leak outwardly or can be spun off by the shaft as generally shown by the arrow 14. In any event, this escaping liquid is constrained in the cavity 9 and will be collected in the base thereof to form a well of liquid. When the level of collected liquid formed in the base of the annular cavity rises sufficiently so that the top touches the conical portion of the rotating shaft, it will be driven up the taper of the cone by centrifugal force and therefore back towards the sealing lip 7 of the shaft seal.

Liquid which is not immediately pumped away by the seal is spun off at the maximum diameter of the cone and returns to the well of liquid in the base of the annular cavity or, alternatively, it may fall onto a smaller diameter of the cone and thereby be propelled back towards the lip of the shaft seal.

Any liquid from the well which might escape past the lip 13 will be caught by the lip 12 and again brought into contact with the conical portion of the shaft.

Turning to FIG. 2, the three schematic representations shown therein illustrate whose cylindrical portions 20 and conical portions 21 are formed integrally with the shaft 1. The representation shown in FIG. 2(i) is in all other essential respects the same as that of FIG. 1. The representations shown in FIGS. 2(ii) and 2(iii) are the same as that of FIG. 2(i) except that details of the apertured disc, etc are omitted for the sake of simplicity. FIGS. 2(ii) and 2(iii) do, however, show convex and concave sides to the conical portion 21 and illustrate different conicities in general.

Figure 3:
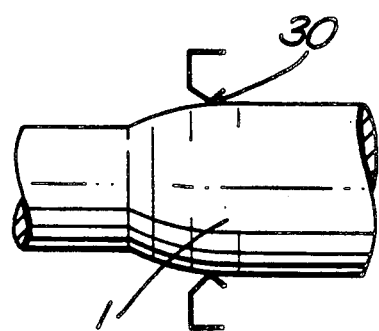

With regard to FIG. 3, this shows in both representations an alternative positioning of the sealing lip 30 about the conical portion of the shaft 1 (illustrated here with an integrally formed cylindrical and conical portions) in the vicinity of the cylindrical portion.

Finally, with regard to FIG. 4, there is shown a sealing arrangement of the invention whose shaft seal 40 and apertured plate 41 are integrally formed and held, as with the alternative arrangements within a housing 42.

In all embodiments of the invention but with particular reference to that shown in FIG. 1, the cavity 9 between the seal 6 and the apertured plate member 10 may if desired be pre-packed with some lubricant, for example grease, on assembly to help lubricate the sealing lip 7 at the start of operation; in such cases the conical portion helps to pump the lubricant towards the lip 7 with the plate member 10 causing it to be retained in the cavity 9 without the aperture plate member 10 making contact with the shaft, thereby avoiding generation of unnecessary heat and wear of the aperture plate member.

While preferred embodiments of the invention have been shown and described in detail, it will readily be understood and appreciated by those skilled in the art that numerous omissions, changes and additions may be made without departing from the spirit and scope of the present invention.

I claim:

1. A sealing arrangement for effecting a seal on a rotatable shaft and thereby preventing escape of a liquid, said sealing arrangement comprising:

a shaft seal including an annular sealing lip engaging the shaft;

a radially extending apertured plate member spaced from the shaft seal and having a circular aperture through which the shaft projects, the circular aperture sized such that the shaft does not contact the plate member;

the shaft having a conically shaped portion passing through the circular aperture;

the shaft seal and the radially extending apertured plate member defining side portions of an annular cavity for collecting any of the liquid escaping past the shaft seal; and the conically shaped portion of the shaft forming at least part of an inner peripheral portion of the annular cavity and having a cross-sectional diameter increasing, in a direction taken from the apertured plate member to the shaft seal, to a maximum diameter greater than that of the circular aperture of the apertured plate member so that the liquid collected in the cavity rises to contact the conically shaped portion of the shaft and thereby is driven by centrifugal force in the direction toward the shaft seal and thus, back to the sealing lip.

2. The sealing arrangement according to claim 1, in which the sealing lip engages a cylindrical portion of the shaft in the vicinity of the conical portion.

3. The sealing arrangement according to claim 1, in which the circular aperture has a diameter less than that of the cylindrical portion of the shaft in which the shaft seal is positioned.

4. The sealing arrangement according to claim 1, in which the radially extending apertured plate member is made from a flexible material.

5. The sealing arrangement according to claim 1, in which an inner peripheral portion of the radially extending apertured plate member defining the circular aperture is double lipped, and has a first lip nearer the shaft seal of greater diameter than a second lip more remote from the shaft sealed in the first lip.

6. The sealing arrangement according to claim 1, in which the conical portion is formed on the shaft by means of a sleeve secured to the shaft.

7. The sealing arrangement according to claim 1, in which the conical portion is formed integrally with the shaft.

8. The sealing arrangement according to claim 1, in which the shaft seal and the radially extending aperture plate member are formed integrally.

* * * * *